US012701066B2

(12) United States Patent
Purkayastha et al.

(10) Patent No.: US 12,701,066 B2
(45) Date of Patent: Aug. 4, 2026

(54) METHODS AND APPARATUSES FOR DISCOVERY AND SELECTION OF A LOCAL NEF

(71) Applicant: InterDigital Patent Holdings, Inc., Wilmington, DE (US)

(72) Inventors: Debashish Purkayastha, Collegeville, PA (US); Robert Gazda, Spring City, PA (US); Michel Roy, Candiac (CA); Saad Ahmad, Montreal (CA); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 208 days.

(21) Appl. No.: 18/019,613

(22) PCT Filed: Aug. 12, 2021

(86) PCT No.: PCT/US2021/045751
§ 371 (c)(1),
(2) Date: Feb. 3, 2023

(87) PCT Pub. No.: WO2022/036100
PCT Pub. Date: Feb. 17, 2022

(65) Prior Publication Data
US 2024/0179081 A1      May 30, 2024

Related U.S. Application Data

(60) Provisional application No. 63/064,744, filed on Aug. 12, 2020.

(51) Int. Cl.
*H04L 43/0876* (2022.01)
*H04L 67/51* (2022.01)

(52) U.S. Cl.
CPC .......... *H04L 43/0876* (2013.01); *H04L 67/51* (2022.05)

(58) Field of Classification Search
CPC ............................ H04L 43/0876; H04L 67/51
USPC .......................................................... 709/224
See application file for complete search history.

(56) References Cited

U.S. PATENT DOCUMENTS

2019/0230556 A1 *  7/2019  Lee ........................ H04W 28/16
2019/0261260 A1 *  8/2019  Dao ....................... H04W 48/00
(Continued)

FOREIGN PATENT DOCUMENTS

WO      WO 2020/035157 A1      2/2020

OTHER PUBLICATIONS

3GPP Standard; Technical Specification; 3GPP TS 29.510, vol. CT WG4, No. V16.2.0 Dec. 20, 2019 (Dec. 20, 2019), pp. 1-167, (Year: 2019).*
(Continued)

*Primary Examiner* — Ario Etienne
*Assistant Examiner* — Kidest Mendaye
(74) *Attorney, Agent, or Firm* — Flaster Greenberg P.C.

(57) ABSTRACT

Methods and apparatuses for discovery and selection of a Local Network Exposure Function (L-NEF) are described herein. A method of for registering with a Network Repository Function (NRF) performed by a L-NEF may include sending, to the NRF, a register registration message that includes a new NF network function (NF) profile, the new NF profile further including an identification of a Local Area Data Network (LADN), Service area information associated with the L-NEF, and a User Plane Function (UPF) Identifier (ID). The method may include receiving a registration response message from the NRF.

14 Claims, 11 Drawing Sheets

(56) References Cited

U.S. PATENT DOCUMENTS

| | | | |
|---|---|---|---|
| 2021/0112402 A1 | 4/2021 | Ullah et al. | |
| 2021/0274392 A1* | 9/2021 | Dao | H04W 36/0033 |
| 2022/0191650 A1* | 6/2022 | Kim | H04L 67/10 |
| 2022/0386228 A1* | 12/2022 | Dao | H04W 36/0009 |
| 2023/0032185 A1* | 2/2023 | Lee | H04L 65/1073 |
| 2023/0034349 A1* | 2/2023 | Mladin | H04W 4/40 |
| 2024/0064105 A1* | 2/2024 | Sharma | H04L 43/0829 |

OTHER PUBLICATIONS

3rd Generation Partnership Project (3GPP), "Study on enhancement of support for Edge Computing in 5G Core network (5GC)", 3GPP TR 23.748 V0.4.0, Jun. 2020, 189 pages.

3rd Generation Partnership Project (3GPP), "Architecture for enabling Edge Applications", 3GPP TS 23.558 V0.3.0, Jun. 2020, 70 pages.

3rd Generation Partnership Project (3GPP), "Network Function Repository Services; Stage 3", 3GPP TS 29.510 V16.2.0, Dec. 2019, 167 pages.

3rd Generation Partnership Project (3GPP), "Network Function Repository Services; Stage 3", 3GPP TS 29.510 V16.4.0, Jul. 2020, 192 pages.

3rd Generation Partnership Project (3GPP), "KI#3, New Solution: Local NEF Deployment for network information exposure to Local AF with Low Latency", Chine Mobile, AT&T, 3GPP TSG-SA WG2 Meeting #139E, Jun. 2020, S2-2003771, 4 pages.

Husain, et al., "3GPP 5G Core Network: An Overview and Future Directions", Journal of Information & Communication Convergence Engineering, 20(1), Mar. 8-15, 2022, 8 pages.

* cited by examiner

Figure 1D:
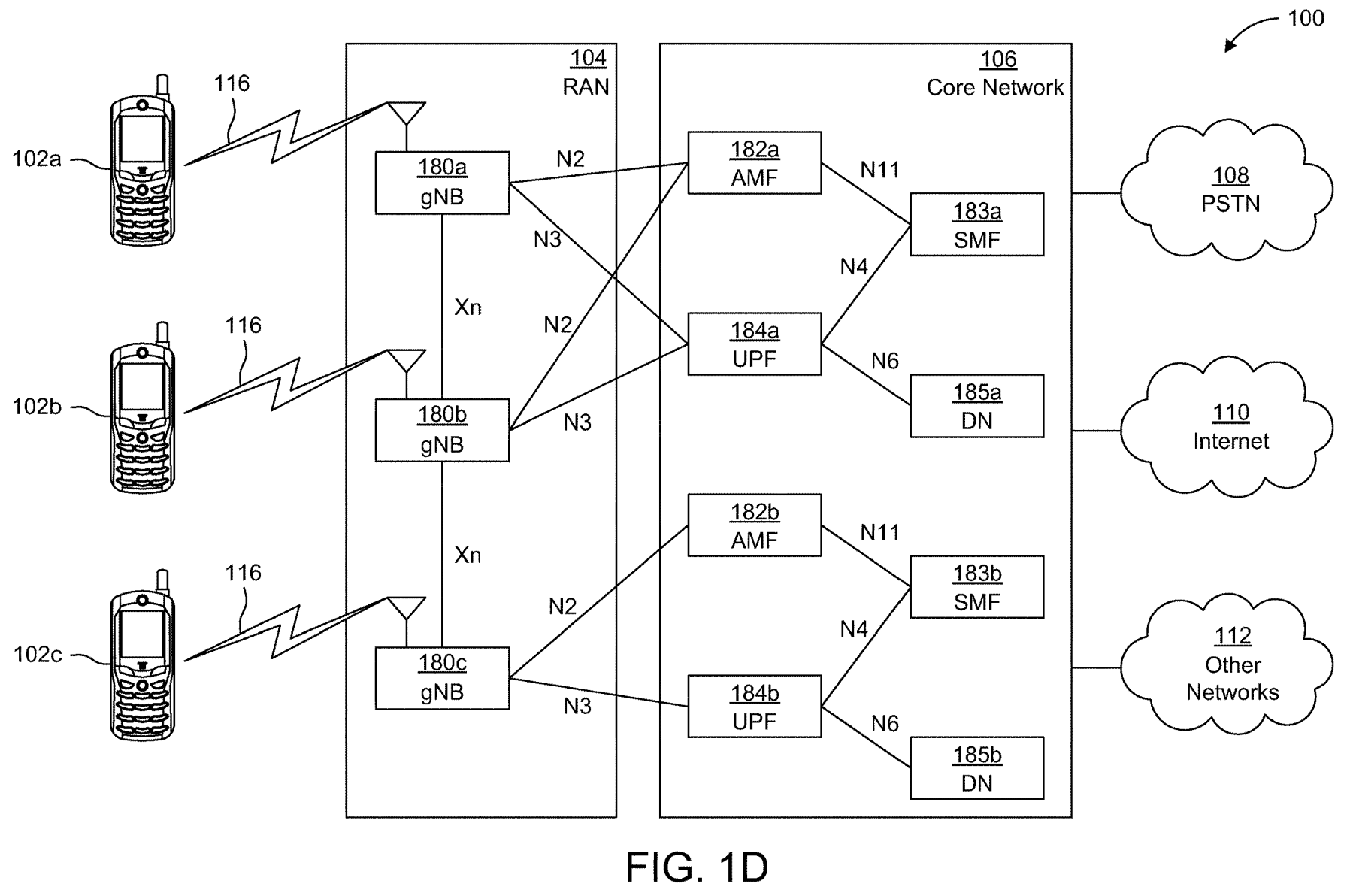

100

106 Core Network

108 PSTN

110 Internet

112 Other Networks

183a SMF

185a DN

183b SMF

185b DN

N11

N4

N6

N11

N4

N6

182a AMF

184a UPF

182b AMF

184b UPF

104 RAN

N2

N3

N2

N3

N2

N3

180a gNB

Xn

180b gNB

Xn

180c gNB

METHODS AND APPARATUSES FOR DISCOVERY AND SELECTION OF A LOCAL NEF

CROSS-REFERENCE TO RELATED APPLICATIONS

This application is the 371 National Stage of International Application No. PCT/US2021/045751, filed Aug. 12, 2021, which claims the benefit of U.S. Provisional Application No. 63/064,744, filed Aug. 12, 2020, the contents of which are incorporated herein by reference.

BACKGROUND

Edge computing may be used for devices to access content and/or services. Generally, edge computing services may be greatly improved if network information can be exposed for consumption by Edge Applications. There may be mechanisms to expose such information from a Core Network, which may reside in a central data center. In some cases, latency may be an issue with such mechanisms such that there is a need for network information to be made available for consumption close to local data network and expose network information close to a local data network. In order to address these needs, there may be one or more approaches that will, for example, find the correct consumption entry point.

SUMMARY

Methods and apparatuses for discovery and selection of a Local Network Exposure Function (L-NEF) are described herein. A method of for registering with a Network Repository Function (NRF) performed by a L-NEF may include sending, to the NRF, a register registration message that includes a new NF network function (NF) profile, the new NF profile further including an identification of a Local Area Data Network (LADN), Service area information associated with the L-NEF, and a User Plane Function (UPF) Identifier (ID). The method may include receiving a registration response message from the NRF.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1D is a system diagram illustrating a further example RAN and a further example CN that may be used within the communications system illustrated in FIG. 1A according to an embodiment;

DETAILED DESCRIPTION

Figure 1A:
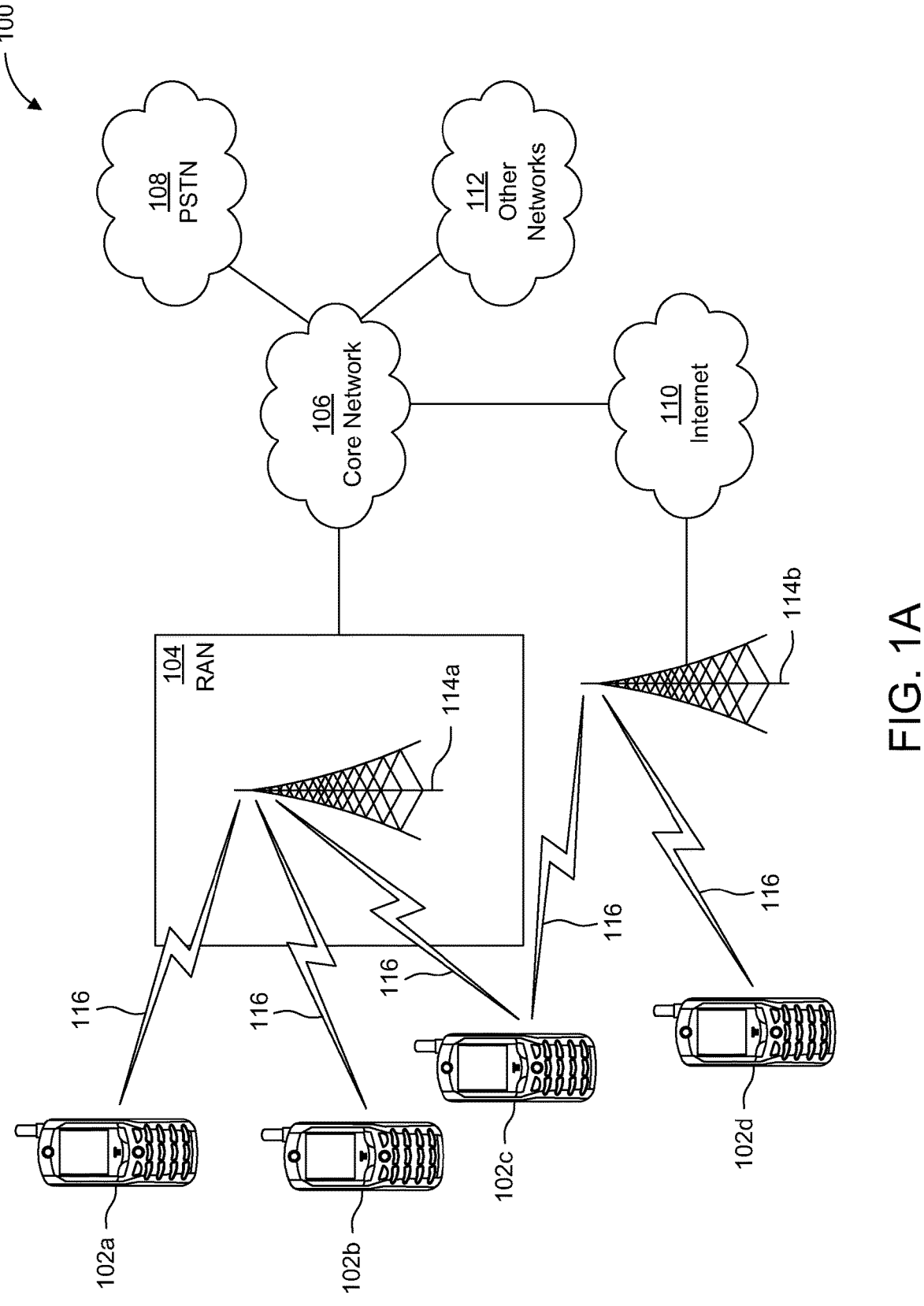
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
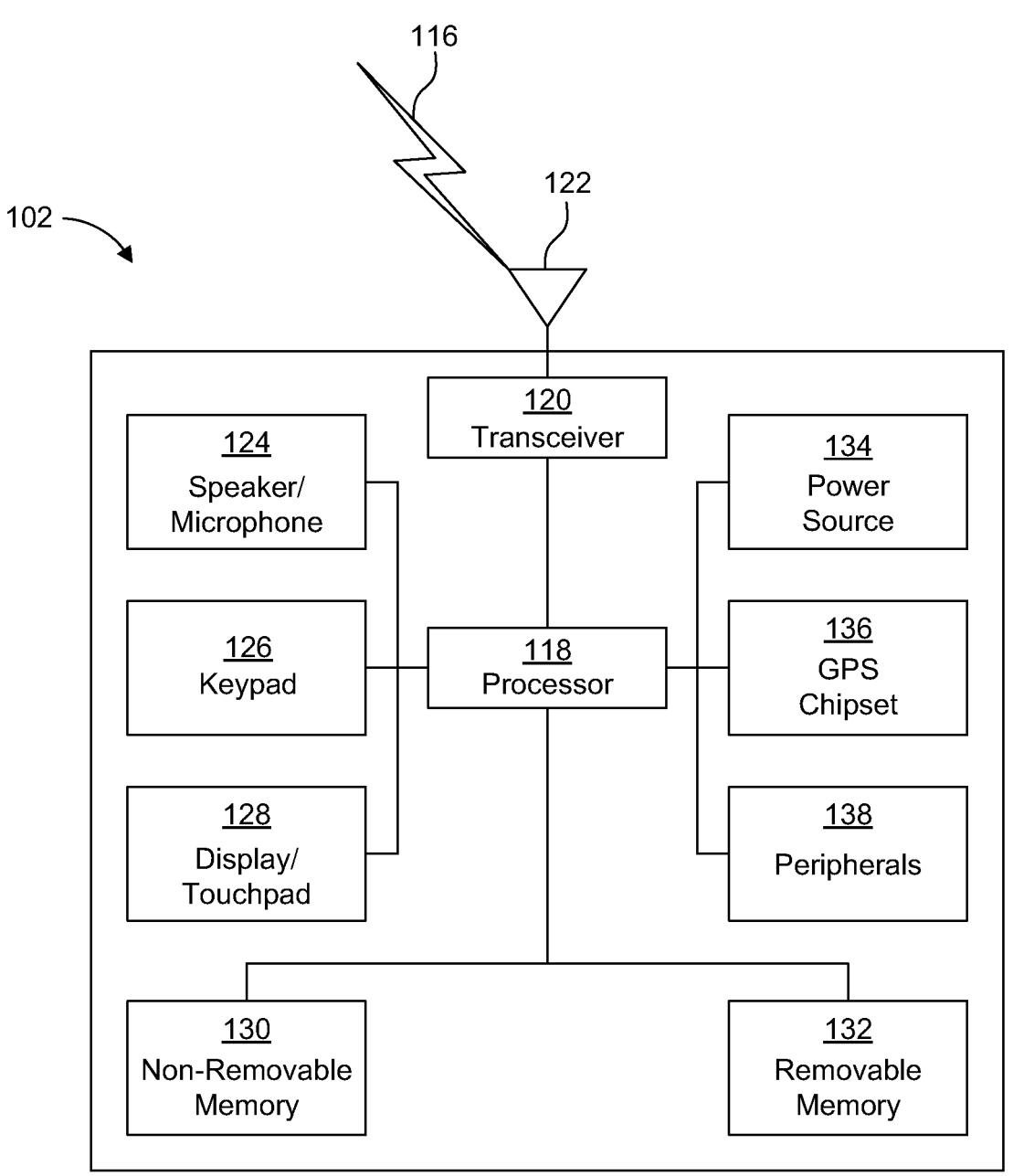
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
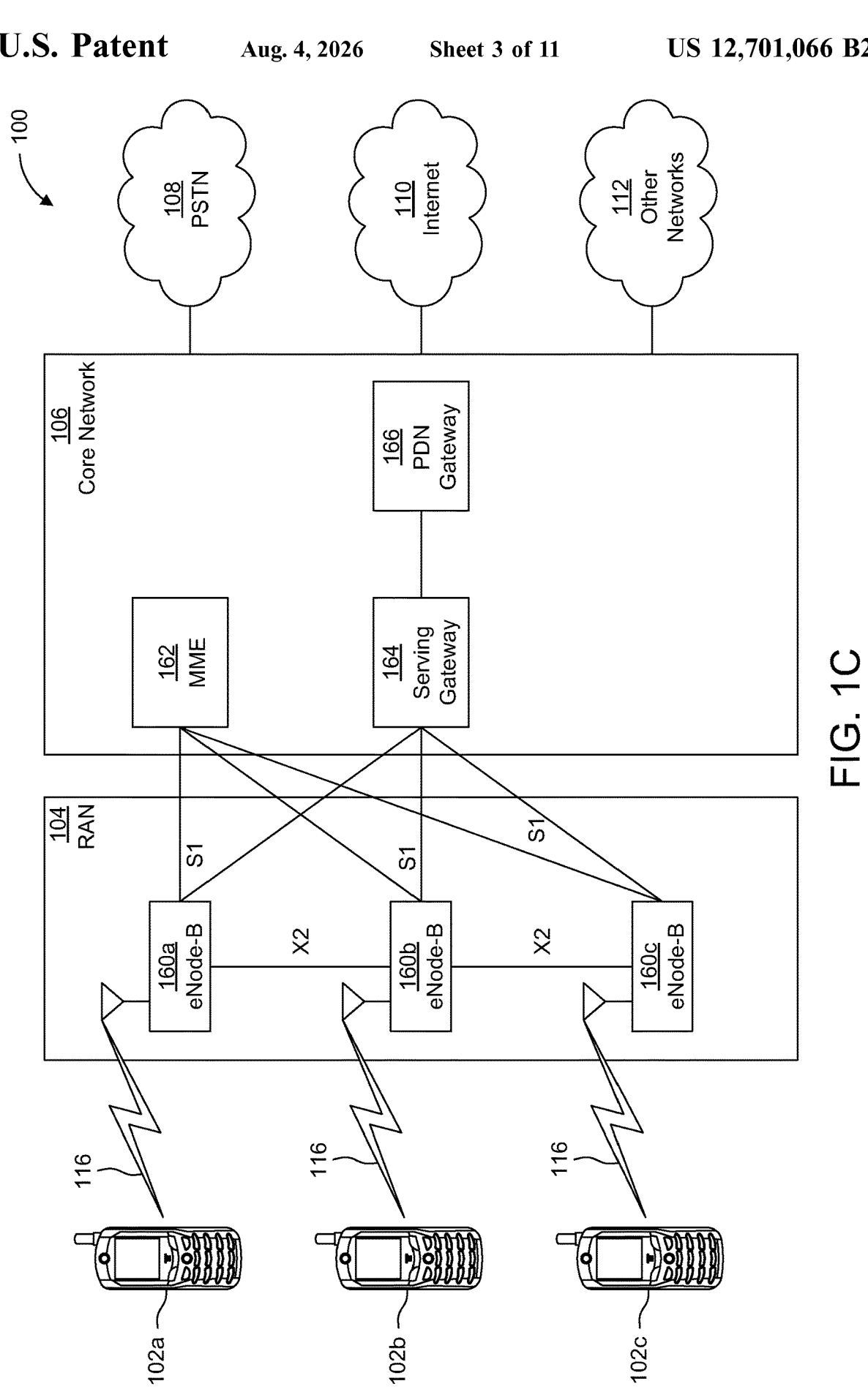
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As described herein, a function (e.g., Application Function, Network Exposure Function) may be a logical entity or a physical entity (e.g., a device). In any given scenario, one or more functions may be operated from the same device (e.g., the same physical entity). In any given scenario, one or more functions may be housed in the same physical housing, but may be separate logical entities. In any given scenario, one or more functions may be virtual. In any given scenario, a function may be operated from a WTRU, a computing device, or other equivalent hardware. In any given scenario, a function may be a node on a network.

In some cases, a local Network Exposure Function (NEF) may be an entity introduced within New Radio (NR) and/or 5G systems. NEF may use a Management Service (MnS) to receive information from one or more MnS producers. An EC Application Function (AF) may ask a Local NEF for RAN information about a WTRU identified by its Subscription Permanent Identifier (SUPI) and/or Generic Public Subscription Identifier (GPSI). In some cases, the EC AF may reach or connect to the Local NEF by one or more techniques discussed herein, in addition to or alternative to pre-configuration and/or pre-provisioning.

Figure 2:
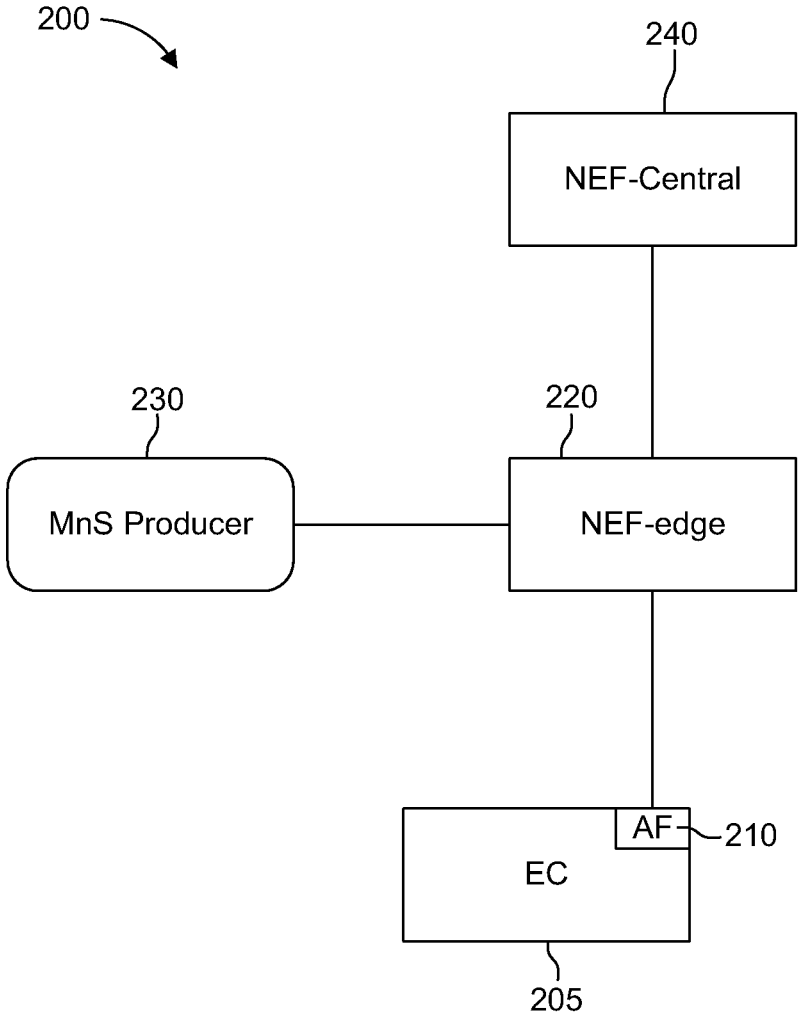
FIG. 2 is a diagram illustrating an example architecture of edge computing (EC) services.

FIG. 2 is a diagram illustrating an example architecture of edge computing (EC) services. In some cases, NEF-edge may be implemented or deployed close to the edge network. As shown in FIG. 2, an example architecture 200 may include an edge computing device (EC) 205, an Edge-NEF (or NEF-edge) device 220, a central NEF (or NEF-Central) device 240, and an MnS producer 230. The EC 205 may include an AF 210. The AF 210 may supply subscription information to the edge-NEF 220 which may then determine how to forward the information. If the requested information is related to the radio network information, the NEF-edge 220 may send the request to the MnS 230. Depending on the queried information, the NEF-edge 220 may forward information to the NEF-Central 240.

In one or more embodiments discussed herein, a local-NEF device or an edge-NEF may be deployed in order to obtain network information by an AF or EAS. As discussed herein, the terms Local-NEF (L-NEF) or Local-NEF device may be used interchangeably with the terms Edge-NEF, NEF-edge, Edge-NEF device, or NEF-edge device.

In some cases, the AF and Local NEF may be deployed in a Customer Premises Equipment and/or a WTRU.

In some cases, it may be assumed that the AF may contact the L-NEF first. The AF may use the MnS service and/or special User Plan Function (UPF) APIs to obtain network information. In some cases, it may be assumed that an AF or EAS may be pre-provisioned with Local NEF reachability information.

In some cases, if the L-NEF is deployed as part of the Local Area Data Network (LADN) or on-premises device, then AFs may reach the L-NEF by default; however, there may be multiple or redundant on-premises deployment of L-NEFs.

In some cases, the L-NEF may be deployed within a Mobile Network Operator (MNO) network as a 5GS CN entity.

In some cases, the L-NEF may also be deployed in wide area of a particular geographic scale (e.g., city, or a block of a city, etc.) to be used by AFs deployed in multiple locations of the area.

In some cases, when an L-NEF is deployed to cover a large area from multiple operators, there may be multiple L-NEFs, which can be used by an AF. It follows then that there may be a need for approaches to perform one or more of the following: discover the correct L-NE, that may be used by an AF from among many L-NEFs from same operator or multiple operators; dynamically provide local AF with L-NEF reachability information such as FQDN, IP address; and/or, once assigned, change the L-NEF at run time due to changes in load, information availability. The term "correct L-NEF" may refer to a NEF that may provide Application Functions, deployed at the Edge of an Mobile Network Operator, with localized access to the 5GC, thereby enabling low latency communications. In some examples, there may be several instances of a Network Exposure Function and some of them could be rather far away (physically or logically) from the Application Function deployed at the Edge of the network, obviating the benefits of using Edge Deployments. Depending on a network implementation, there may be one or more correct L-NEFs at any instant.

In one or more scenarios discussed herein, a Network Repository Function (NRF) may be used to discover the L-NEF. The L-NEF may register with the NRF. The AF may query the NRF through the NEF to discover the correct L-NEF.

In one or more scenarios discussed herein, an Edge Application Server (EAS) and/or Edge Enabler Server (EES) may subscribe to the NRF for updates related to the L-NEF. When an L-NEF registers, based on subscription criterion, the EAS/EES may be informed about the appropriate L-NEF.

In one or more scenarios discussed herein, UP communication may be used between WTRU/EEC and EES/EAS to provide L-NEF information, which may be specific for the given edge application.

Figure 3:
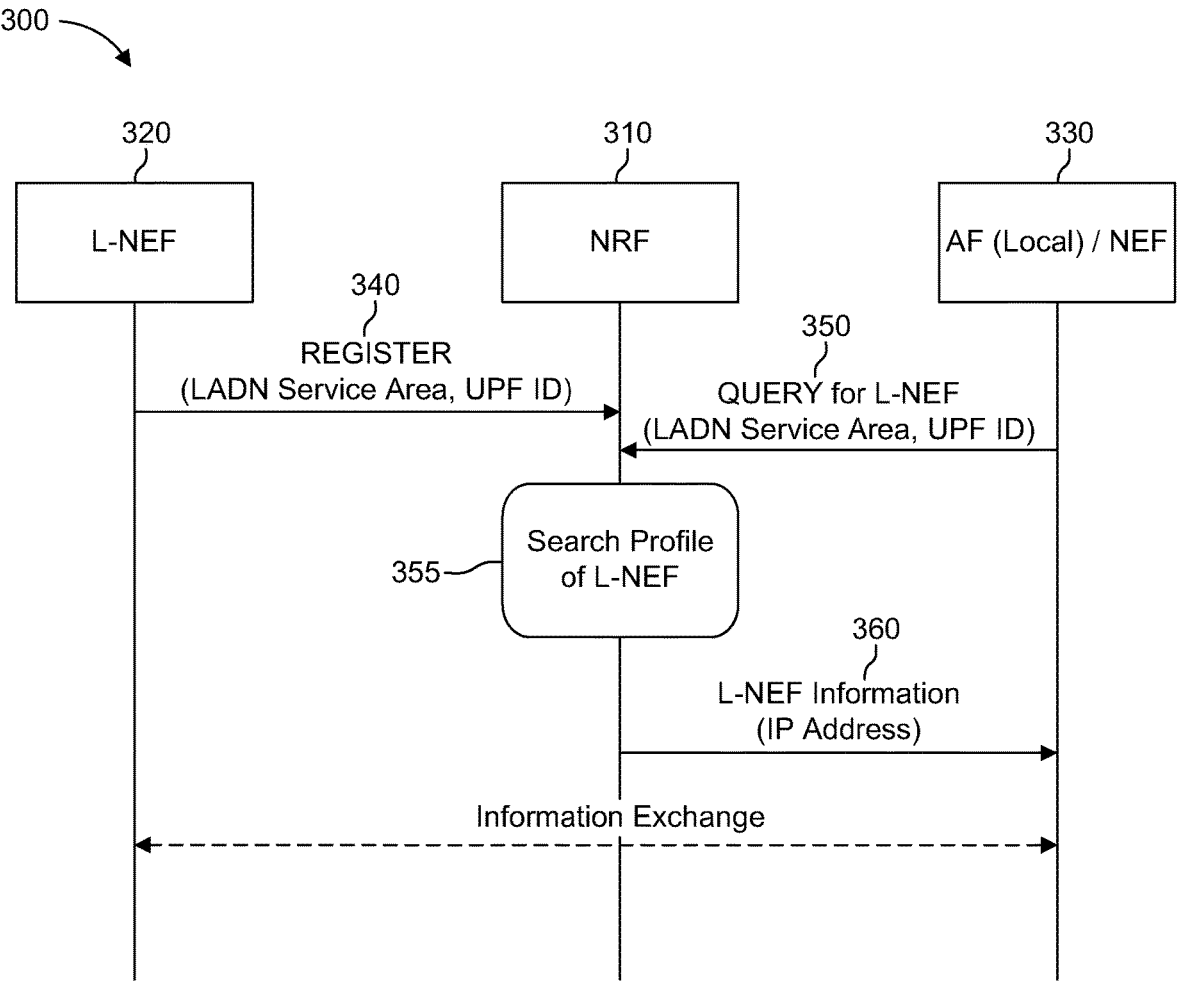
FIG. 3 is a diagram illustrating an example architecture in which an NRF is used to discover an L-NEF.

FIG. 3 is a diagram illustrating an example architecture in which an NRF is used to discover an L-NEF. The architecture 300 may include an NRF 310, a L-NEF 320, Local AF and a Central NEF (shown adjacent to the AF) 330. NF registration and/or Service Discovery (e.g., in the same PLMN) procedures may be used to register and facilitate discovery of the L-NEF 320. In one step (e.g., a first step as shown in FIG. 3), at 340, the L-NEF 320 may follow an NF-Register procedure to register an NF-Profile with the NRF 310. In another step (e.g., a second step as shown in FIG. 3) at 350, the AF 330 may query a central NEF (not illustrated in FIG. 3) for L-NEF. As shown at 355, query parameters may be provided through the AF 330 to search 355 and discover L-NEF information 360). In some cases, the Local AF 330 or EAS and Local NEF 340 may be deployed in a CPE.

The L-NEF may follow a registration procedure (e.g., an "NFRegister" procedure) to announce its service details and availability. Profile information, (which may be referred to as "NFProfile") may be used to register 340 a NF with the NRF 310. L-NEF may provide an "NFProfile", with one or more information elements as will be described further herein.

The L-NEF may be a different NF as compared to a legacy NEF. Features and capabilities of the L-NEF, with reference to FIG. 3, may be as follows: the L-NEF 320 may receive a query 350 from AF 330, and depending on the query may forward to a local information source or the central NEF 330. The L-NEF 320 may have the capability to discover correct information source in a local area (e.g., if a User Plane Function (UPF) acts as an information source, then the L-NEF may discover the correct UPF).

Network Function Types (or "NFType") may be enumerated so as to represent different types of Network Functions or Network Entities that can be found in the 5GC. A Local-NEF may be identified by a special Network Function type ("NFtype"), e.g., "LNEF."

In some embodiments, new data types supporting operation of the L-NEF may be defined.

For example, in some cases, the L-NEF may be associated with a LADN service area. The LADN may be a Data Network to which the WTRU can connect with a LADN session, for example, when the WTRU is in a certain area (e.g., the LADN Service Area).

When an operator plans the LADN service, it may configure the LADN information, which may include a Data Network Name (DNN) and LADN service area (e.g., a set of tracking areas (TAs).

The 5G Core Network may notify the WTRU of the LADN information that may be available to the WTRU, based on the WTRU location. When the WTRU registers to the network, if the registration area contains the LADN service area, the network (e.g., AMF) may inform the WTRU of the available LADN Data Network Name(s) (DNNs), with their LADN Service Areas.

Figure 4:
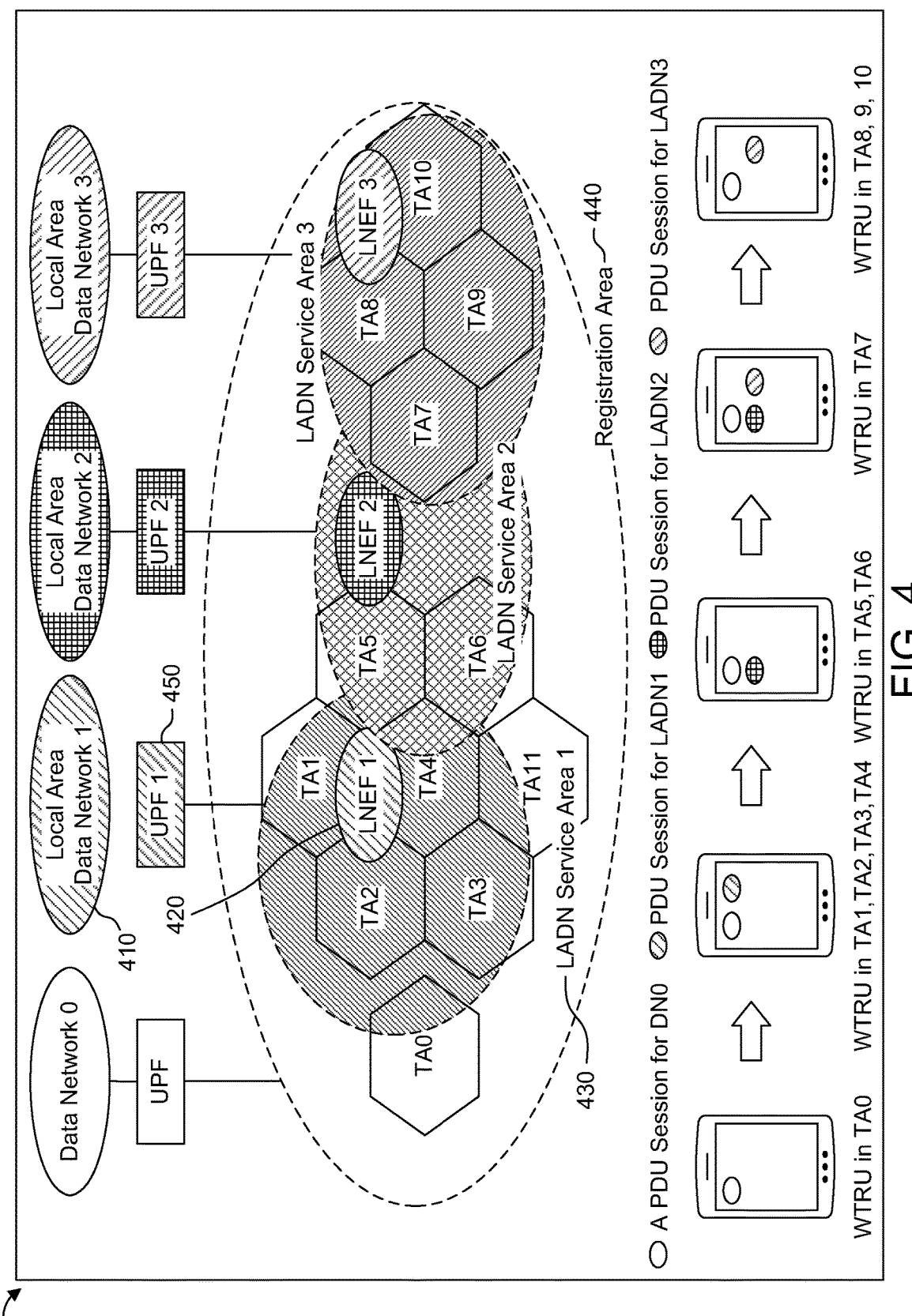
FIG. 4 is a diagram illustrating an example of an architecture incorporating multiple LADNs.

FIG. 4 is a diagram illustrating an example of an architecture incorporating multiple LADNs. As shown in FIG. 4, the LADNs may provide coverage within the same registration area 440, and each of the LADNs may be associated with their own service area within the registration area. For instance, a first LADN 410 may be associated with a first LADN service area 430. An L-NEF 410 may be deployed and associated with the LADN service area 420. An LADN, e.g., LADN 410, may utilize a UPF, e.g., a first UPF 440. In some circumstances, a UPF may be used to deploy an L-NEF.

In the NFProfile, a new data type or information element (IE) "LnefInfo" may be introduced, which may indicate the LADN(s) that a L-NEF is associated with. "LnefInfo" may be defined by at least one mandatory parameter or attribute "sNssaiLnefInfoList" which may describe a list of parameters supported by the LNEF per Single—Network Slice Selection Assistance Information (S-NSSAI). A more detailed list of parameters or attributes, any of which may define the "LnefIno" element, is provided below in Table 1.

criteria. It may also provide to the SCP the profile (e.g., including IP address(es) or FQDN) of the SCP Instance(s) matching certain input criteria.

TABLE 1

Attributes defining the Information Element "LnefInfo"

| Attribute name | Data type | P | Cardinality | Description |
|---|---|---|---|---|
| sNssaiLnefInfoList | array(SnssaiLnefInfoItem) | M | 1 . . . N | List of parameters supported by the LNEF per S-NSSAI |
| smfServingArea | array(string) | O | 1 . . . N | The SMF service area(s) the LNEF can serve. |
| Upfinfolist | array(UpfInfo) | O | 1 . . . N | List of UPF it is in proximity or associated |
| ladnInfo | LadnInfo | O | 0 . . . 1 | Identifies the LADN service area, may include DNN name and LADN Service area |
| taiList | array(Tai) | O | 1 . . . N | The list of TAIs the LNEF can serve. It may contain the non-3GPP access TAI. |
| geoLocation | string | O | 1 | Geo location of the L-NEF deployment |

Further describing the NFProfile, in some cases, the NFProfile may be updated to include modified and/or new information elements. Such modified or newly added information elements are provided below in Table 2. For example, the NFProfile may contain at least one of: an nfInstanceId configured to uniquely identify an NF Instance, an nfType which is a Type of Network Function, or a nfStatus which indicates the status of the NF Instance. In some circumstances, for example, if the nfStatus is changed, the NRF may notify NFs that are subscribed for notifications of the changes of the NF profile.

The NFDiscover operation may be invoked by an NF Service Consumer (e.g., "source NF") or SCP requesting to discover NF instances (e.g., "target NFs") located in the same PLMN, or in a different PLMN. The NFDiscover operation may also be invoked by an SCP requesting to discover SCP instances located in the same PLMN.

The NFDiscover operation may discover the set of NF Instances, and in some cases their associated NF Service Instances, represented by their NF Profile that are currently registered in NRF and satisfy several input query parameters.

TABLE 2

List of possible modified/newly added information elements for NFProfile.

| Attribute name | Data type | P | Cardinality | Description |
|---|---|---|---|---|
| nfInstanceId | NfInstanceId | M | 1 | Unique identity of the NF Instance. |
| nfType | NFType | M | 1 | Type of Network Function |
| lnefInfo | LnefInfo | O | 0 . . . 1 | Lnef information, such as DNAI, LADN and Geo Location information |

With further reference to the second step of FIG. 3, described substantially in paragraphs above, a local AF may query an NRF directly or through the NEF to discover available L-NEFs, e.g., by sending the LADN name or LADN service area, UPF Information, or other information.

The NEF may use a discovery service to facilitate a response to such query. The discovery service may be further referred to herein by "Nnrf_NFDiscovery." New query parameters for use in the AF query may be introduced to search and discover the required L-NEF with attributes such as LADN name, LADN Service Area or UPF Information, or Geo Location information.

The service operations defined for the Nnrf_NFDiscovery service may include NFDiscover, which provides to an NF service consumer or Service Communication Proxy (SCP) the profile (e.g., including IP address(es) or FQDN) of the NF Instance(s) or NF Service(s) matching certain input The NF Profile objects returned in a successful result may contain generic data of each NF Instance, e.g., applicable to any NF type, and/or the objects returned may also contain NF-specific data, such as for those NF NF Instances belonging to a specific type. For example, the attribute "udrInfo" may be present in the NF Profile when the type of the NF Instance takes the value "UDR"). In addition, the attribute "customInfo", may be present in the NF Profile for those NF Instances with custom NF types.

Another operation, e.g., a "GET" operation, may retrieve a list of NF Instances, and their offered services registered in the NRF and satisfying a number of filter criteria, such as those NF Instances offering a certain service name, or those NF Instances of a given NF type (e.g., AMF). Table 3 provides a list containing various examples of URI query parameters supported by the GET operation.

TABLE 3

List of example URI query parameters supported by the GET operation.

| Name | Data type | P | Cardinality | Description | Applicability |
|---|---|---|---|---|---|
| target-nf-type | NFType | M | 1 | This IE shall contain the NF type of the NF Service Producer being discovered. In this case LNEF is used | |

TABLE 3-continued

List of example URI query parameters supported by the GET operation.

| Name | Data type | P | Cardinality | Description | Applicability |
|------|-----------|---|-------------|-------------|---------------|
| requester-nf-type | NFType | M | 1 | This IE shall contain the NF type of the NF Service Consumer that is invoking the Nnrf_NFDiscovery service. In this case it can be EES, EAS | |
| lnefInfo | LnefInfo | O | 0 . . . 1 | Lnef information, such as DNN name, LADN Service area, Geo Location if target NF is LNEF. | |

A default logical relationship among the query parameters may be a logical "AND" (e.g., all the provided query parameters may be matched) with the exception of the "preferred-locality" or the "preferred-nf-instances". The NRF may support the Complex query expression for the NF Discovery service. If the "complexQuery" query parameter is included, then the logical relationship among the query parameters contained in "complexQuery" query parameter may be standardized. A NRF not supporting the Complex query expression may, in some cases, reject a NF service discovery request including a complexQuery parameter, with a ProblemDetails IE including the cause attribute set to INVALID_QUERY_PARAM and the invalidParams attribute indicating the complexQuery parameter.

In some scenarios, an edge enabler server (EES) may be used to obtain L-NEF information. It may be assumed for such scenarios that the L-NEF is a NF type not present in legacy approaches, deployed by the operator in proximity of Edge Application Servers (EAS).

An L-NEF may be deployed as an EAS on a EDN/EES. The L-NEF, being a MNO EAS, may then communicate with a 5GC via EDGE-7 and/or through EDGE-3. In some cases, a third party L-NEF may also be deployed as EAS in an EDN. In such a case, the L-NEF may communicate with the 5GC through the NEF.

The L-NEF may register with the NRF, per any one of methods disclosed herein (e.g., via any one of the methods described herein with respect to FIG. 3). In some cases, there may be an extension of the EDGE-3 interface between the EAS and the EES. Also, the EDGE-2 interface may be used for EES to communicate with NEF, but this may fall into the category of NEF communication.

Figure 5:
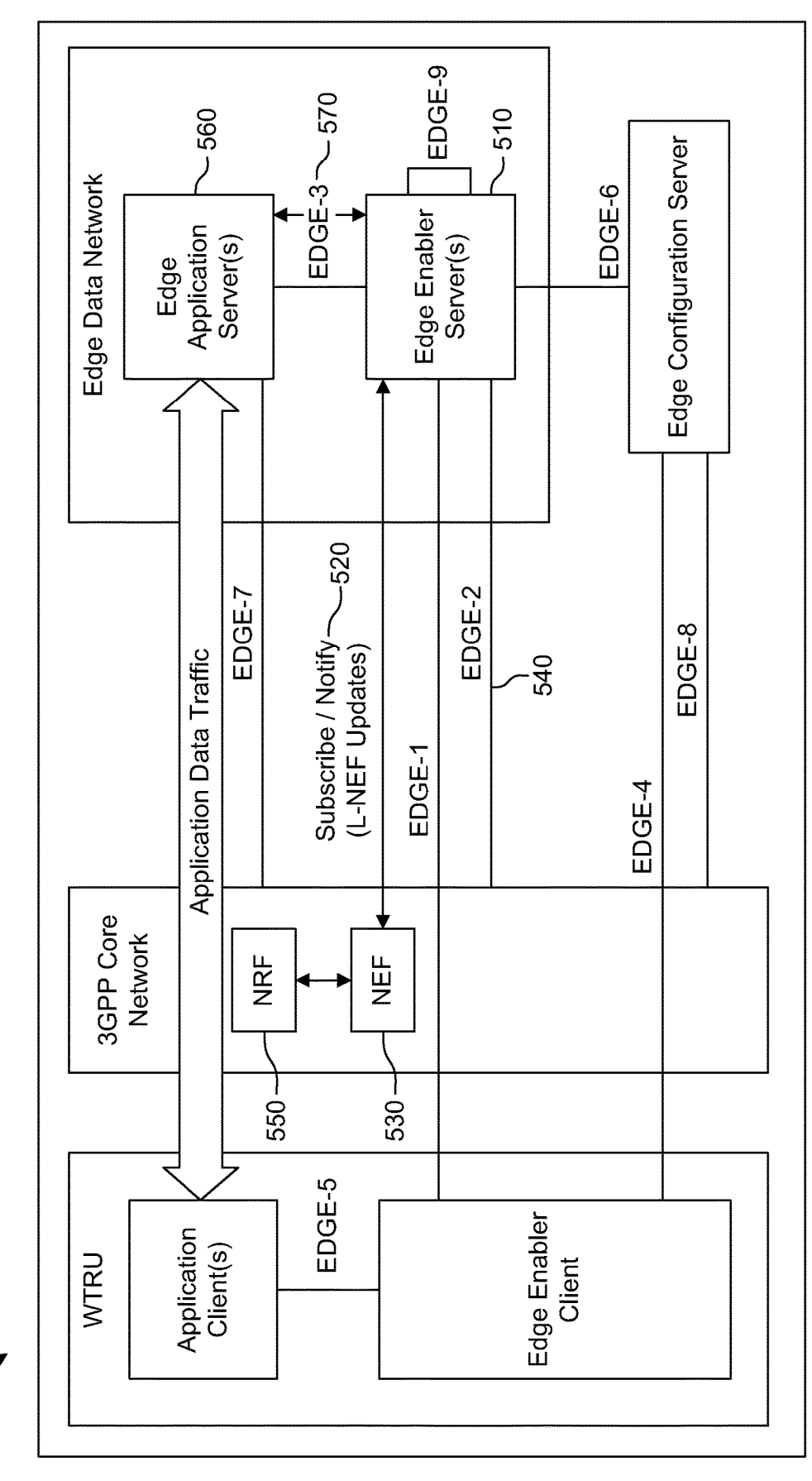
FIG. 5 is a diagram illustrating an architecture in which an edge enabler server (EES) is used to obtain L-NEF information.

FIG. 5 is a diagram illustrating an architecture in which an edge enabler server (EES) is used to obtain L-NEF information. As shown in FIG. 5, the architecture 500 may include one or more EESs 510, an NEF 530, and an EDGE-2 interface 540, over which the one or more EESs 510 may communicate with the NEF and/or an NRF 550. One or more EASs 560 may communicate with the one or more EESs 510 using an EDGE-3 interface 570.

The EESs 510 may, at 520, "subscribe" to the NEF 530 for updates related to anL-NEF (not illustrated in FIG. 5) using the EDGE-2 interface 540. The NEF 530 may internally subscribe to NRF 550 for available an L-NEF.

The NEF 530 (or NRF 550) may collect such information and "notify," at 520, the Edge Enabler Server 510 about available L-NEFs over EDGE-2 540 interface.

The one or more EASs 560 may obtain L-NEF information from Edge Enabler Server 510 over the EDGE3 interface 570.

The EDGE-3 interface (or reference point) may support one or more of the following: registration of Edge Application Servers with availability information (e.g., time constraints, location constraints); de-registration of Edge Application Servers from the Edge Enabler Server; providing access to network capability information (e.g., location information); and/or, extended to support obtaining L-NEF information, as described herein.

In some embodiments, such as those described herein, an L-NEF information may be provided to an EAS by an update to EAS registration over EDGE-3.

Figure 6:
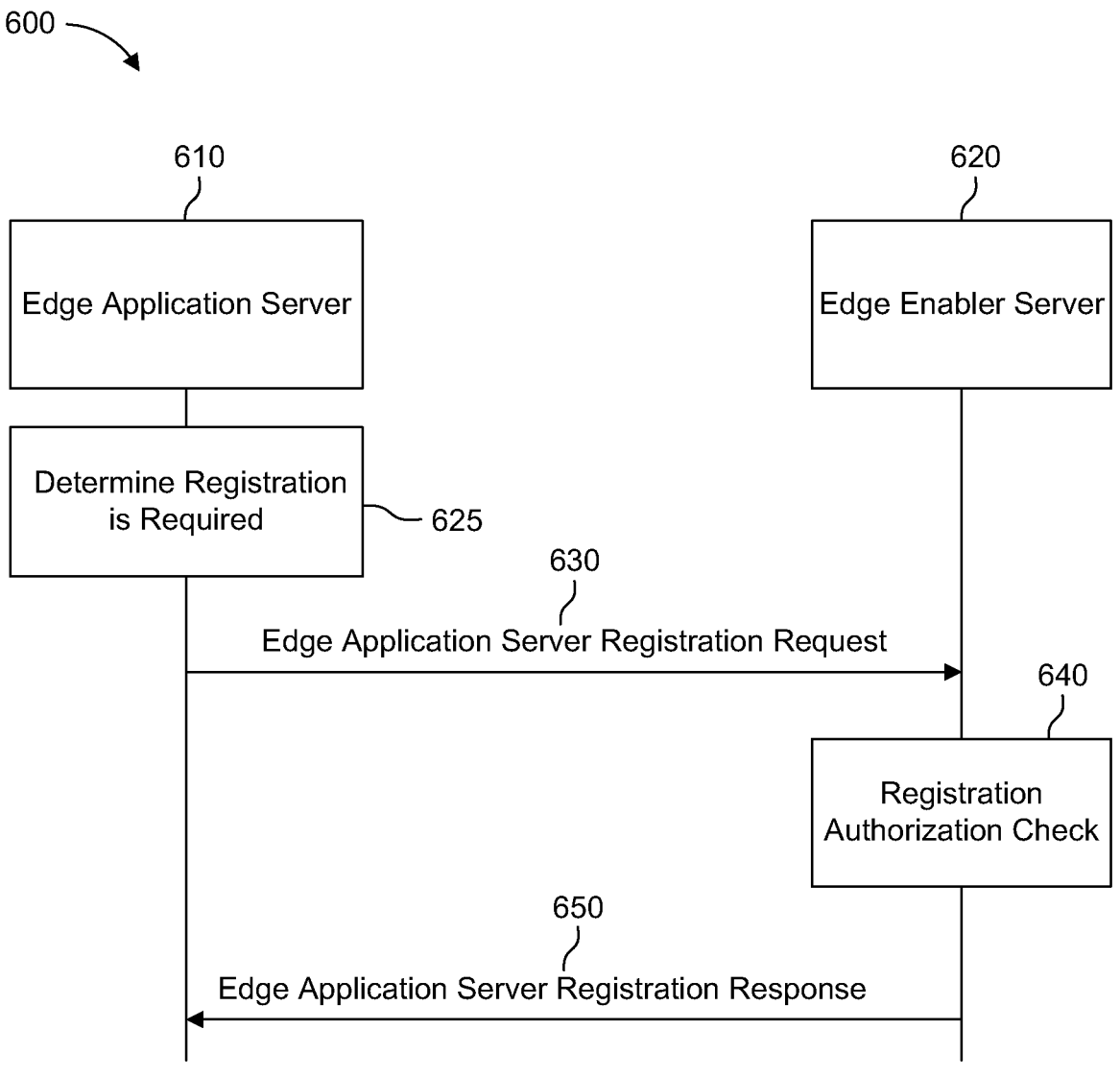
FIG. 6 is a diagram illustrating an example architecture supporting registration of an Edge Application Server (EAS) with an Edge Enabler Servers (EES)

FIG. 6 is a diagram illustrating an example architecture supporting registration of an Edge Application Server (EAS) with an Edge Enabler Server (EES). The example architecture illustrated in FIG. 6 may include an EAS 610 and an EES 620.

A registration procedure according to FIG. 6 may involve determining, e.g., at 625 if registration of EAS is required and sending an EAS Registration request 630 from the EAS 610 to the EES 620. The EES 620 may then perform a Registration Authorization Check, e.g., as shown at 640 and update and/or send a registration response 650 to the EAS 610.

The EAS Registration Response message 650 may be updated to include L-NEF information. For instance, information elements in the EAS Registration Response from the EES to the EAS may include L-NEF details, such as an IP address, FQDN, and one or more LADN Service Areas.

In some scenarios, UP communication may be used between one or more WTRUs and EAS/AF to provide L-NEF information, which may be specific for an edge application. In such scenarios, the WTRU may be informed about the L-NEF via a policy update procedure. The WTRU may then use application level communication to inform EAS about the L-NEF to be used.

Figure 7:
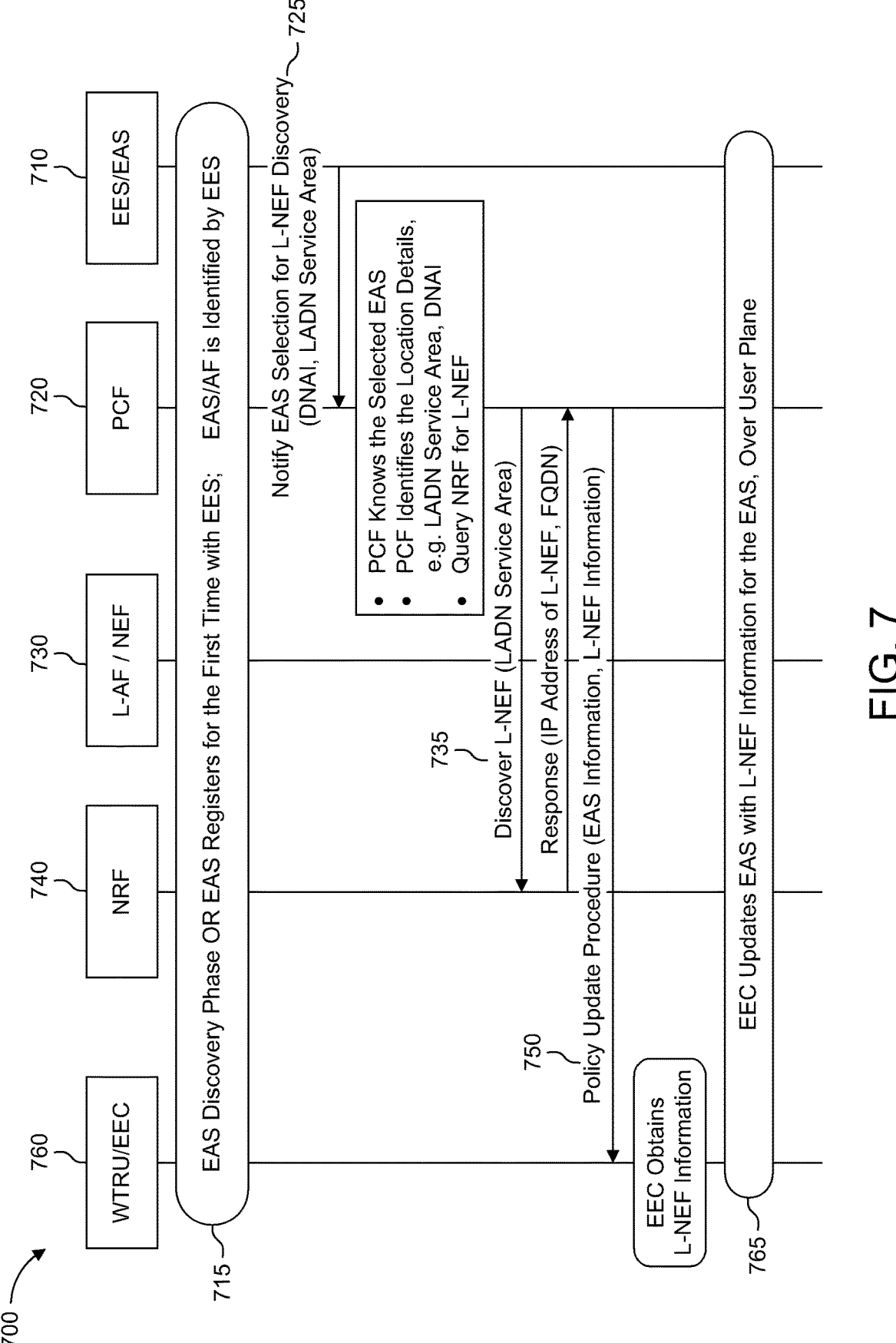
FIG. 7 is a diagram illustrating an example edge application communication procedure.

FIG. 7 is a diagram illustrating an example of an Edge Application communication procedure. The procedure may involve an EES 710, a Policy Control Function (PCF) 720, an AF or NEF 730, which may be an L-AF/L-NEF, an NRF 740, and a WTRU/EEC 760. As shown at 715, an EAS discovery procedure may be performed. Alternatively, or additionally, at 715, the EAS may register for the first time with the EES. After the EAS discovery procedure, and/or after the EAS registers with the EES, the EES 710 may inform, at 725, the PCF 720 about a selected EAS (not shown in FIG. 7), which may be based on a EAS profile, Application Client profile, and/or Capability. The EES 710 may also include the Data network name, Data network identifier and LADN service area, if applicable. This may require a new interface from EES to PCF. The PCF 720 may use information obtained from the EAS 710, such as the EAS, such as Data Network Identifier, LADN service area, to query the NRF 740 and discover, at 735, an available L-NEF 730. If the L-NEF 730 is not available, the PCD 720 may trigger deployment of an L-NEF in a specified LADN. If L-NEF 730 is available, NRF 740 sends the L-NEF profile information 730 to PCF 720 via a response, as shown at 735, which may include an IP address of the L-NEF 730 and/or an FQDN. The PCF 720 may perform a Policy update procedure as shown at 750 to inform the EEC 760 of the L-NEF information. This may include an indication of special L-NEF for that specific application session. The PCF 720 may also send NSSAI (Network Slice Identifier) information, which indicates the L-NEF. Based on the slice identifier, WTRU/EEC 760 may identify the L-NEF 730.

In some embodiments, an EEC may expose the L-NEF information to a WTRU application using an EDGE-5 interface. Alternatively, or additionally, an EEC may not expose the information to any WTRU application, due to policy constraints. An EEC may use an application level mechanism to provide the L-NEF information, to be used by an EAS, to the EES using an EDGE-1 interface.

In some embodiments, an EES may provide L-NEF information to an EAS using an EDGE-3 interface.

Figure 8:
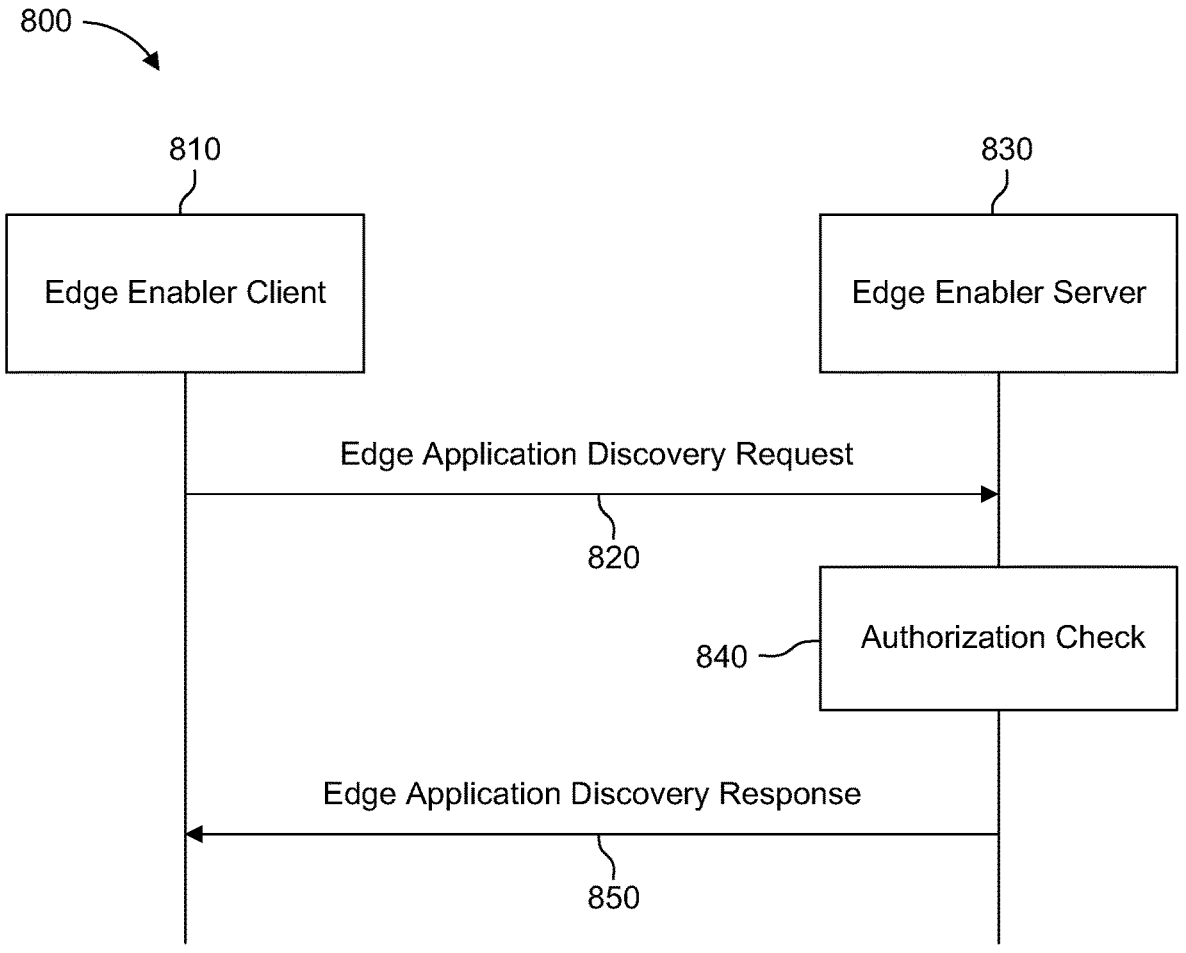
FIG. 8 is a diagram illustrating an example Edge Application Discovery procedure.

FIG. 8 is a signaling diagram illustrating an example p of an Edge Application discovery procedure. The procedure may involve an Edge Enabler Client 810 and an Edge Enabler Server 830. The Edge Enabler Client 810 may send a discovery request, shown at 820, to the Edge Enabler Server 830. After the Edge Enabler Server 830 performs an authorization check, shown at 840, upon successful authorization, the Edge Enabler Server 830 may send an Edge Application Server discovery response, shown at 850, including information about the discovered Edge Application Servers. For registered and/or discovered Edge Application Servers, this may include endpoint information. Depending on the query filters or Application Client Profiles in the discovery request, the response may include additional information regarding matched capabilities, e.g. service permissions levels, Application Client locations that the Edge Application Servers can support, KPIs, or other information.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a network repository function (NRF), the method comprising:

receiving a plurality of registration messages from a plurality of local network exposure function (L-NEFs), wherein each of the registration messages comprises a respective network function (NF) profile associated with a respective L-NEF, and wherein the respective NF profile comprises an identification of one or more of information indicating a data network served by the respective L-NEF, an identification of a tracking area associated with the respective L-NEF and geographical information associated with the respective L-NEF;

receiving, from a local application function (L-AF) through an NEF, a request to identify an available L-NEF, the request indicating L-NEF selection criteria, wherein the L-NEF selection criteria comprise information associated with a desired data network, a desired tracking area, and desired geographical information;

selecting an L-NEF out of the plurality of L-NEFs that is associated with a respective NF profile that comprises information indicating a data network that matches the desired data network of the request, a tracking area that matches the desired tracking area of the request, and geographical information that matches the desired geographical information of the request; and sending a response to the request, the response identifying the selected L-NEF.

2. The method of claim 1, wherein the request to identify an available L-NEF is received from a NEF.

3. The method of claim 1, wherein the response comprises a fully qualified domain name (FQDN) or internet protocol (IP) address of the available L-NEF.

4. The method of claim 1, wherein the request to identify the available L-NEF further indicates one or more of a local area data network (LADN) name, an LADN service area, or user plane function (UPF) information, and wherein the method further comprises selecting an L-NEF out of the plurality of L-NEFs that is associated with a respective NF profile based on one or more of the LADN, the LADN service area, or UPF information.

5. The method of claim 1, wherein an edge application server (EAS) or edge enabler server (EES) subscribes to the NRF for updates related to L-NEF registration.

6. The method of claim 1, further comprising:

deploying the L-NEF over a service area associated with a local area data network (LADN).

7. The method of claim 1, further comprising:

configuring the L-NEF to discover a UPF if the UPF acts as a local information source.

8. A network repository function (NRF) comprising:

a processor configured to:

receive a plurality of registration messages from a plurality of local network exposure function (L-NEFs), wherein each of the registration messages comprises a respective network function (NF) profile associated with a respective L-NEF, and wherein the respective NF profile comprises an identification of one or more of information indicating a data network served by the respective L-NEF, an identification of a tracking area, and geographical information associated with the respective L-NEF;

receive, from a local application function (L-AF) through an NEF, a request to identify an available L-NEF, the request indicating L-NEF selection criteria, wherein the L-NEF selection criteria comprise information associated with a desired data network, a desired tracking area, and desired geographical information;

select an L-NEF out of the plurality of L-NEFs that is associated with a respective NF profile that comprises information indicating a data network that matches the desired data network of the request, a tracking area that matches the desired tracking area of the request, and geographical information that matches the desired geographical information of the request; and send a response to the request, the response identifying the selected L-NEF.

9. The NRF of claim 8, wherein the request to identify an available L-NEF is received from a NEF.

10. The NRF of claim 8, wherein the response comprises a fully qualified domain name (FQDN) or internet protocol (IP) address of the available L-NEF.

11. The NRF of claim 8, wherein the request to identify the available L-NEF further indicates one or more of a local area data network (LADN) name, an LADN service area, or user plane function (UPF) information, and the processor is further configured to select an L-NEF out of the plurality of L-NEFs that is associated with a respective NF profile based on one or more of the LADN, the LADN service area, or UPF information.

12. The NRF of claim 8, wherein an edge application server (EAS) or edge enabler server (EES) subscribes to the NRF for updates related to L-NEF registration.

13. The NRF of claim 8, wherein the processor is configured to:

deploy the L-NEF over a service area associated with a local area data network (LADN).

14. The NRF of claim 8, wherein the processor is configured to:

configure the L-NEF to discover a UPF if the UPF acts as a local information source.

\*  \*  \*  \*  \*